US012810622B2

(12) United States Patent
Simoncini et al.

(10) Patent No.: US 12,810,622 B2
(45) Date of Patent: Nov. 24, 2026

(54) SYSTEMS AND METHODS FOR VIDEO CAPTIONING SAFETY-CRITICAL EVENTS FROM VIDEO DATA

(71) Applicant: Verizon Patent and Licensing Inc., Basking Ridge, NJ (US)

(72) Inventors: Matteo Simoncini, Florence (IT); Douglas Coimbra De Andrade, Florence (IT); Leonardo Taccari, Florence (IT); Leonardo Sarti, Florence (IT); Francesco Sambo, Florence (IT); Fabio Schoen, Florence (IT); Niccolo Bellaccini, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 758 days.

(21) Appl. No.: 17/682,610

(22) Filed: Feb. 28, 2022

(65) Prior Publication Data

US 2023/0274555 A1 Aug. 31, 2023

(51) Int. Cl.

| | |
|---|---|
| ***G06V 10/40*** | (2022.01) |
| ***G06N 3/044*** | (2023.01) |
| ***G06N 3/045*** | (2023.01) |
| ***G06V 10/82*** | (2022.01) |
| ***G06V 20/58*** | (2022.01) |

(52) U.S. Cl.

CPC ............. *G06V 20/58* (2022.01); *G06N 3/044* (2023.01); *G06N 3/045* (2023.01); *G06V 10/40* (2022.01); *G06V 10/82* (2022.01)

(58) Field of Classification Search

CPC ........ G06V 20/58; G06V 10/40; G06V 10/82; G06V 10/764; G06V 20/56; G06N 3/044; G06N 3/045; G06N 3/048; G06N 3/0442; G06N 3/0455; G06N 3/09; G06N 3/0464

See application file for complete search history.

(56) References Cited

U.S. PATENT DOCUMENTS

| | | | | |
|---|---|---|---|---|
| 11,526,721 | B1 * | 12/2022 | O'Malley | G06F 30/15 |
| 2018/0225519 | A1 * | 8/2018 | Chen | G06V 20/47 |
| 2021/0281774 | A1 * | 9/2021 | Pei | H04N 21/4884 |

(Continued)

OTHER PUBLICATIONS

Li, Sheng, et al. "Visual to text: Survey of image and video captioning." IEEE Transactions on Emerging Topics in Computational Intelligence 3.4 (2019): 297-312.https://ieeexplore.ieee.org/abstract/document/8627985 (Year: 2019).*

(Continued)

*Primary Examiner* — Han Hoang

(57) ABSTRACT

A device may receive a video and corresponding sensor information associated with a vehicle, and may extract feature vectors associated with the corresponding sensor information and an appearance and a geometry of another vehicle captured in the video. The device may generate a tensor based on the feature vectors, and may process the tensor, with a convolutional neural network model, to generate a modified tensor. The device may select a decoder model from a plurality of decoder models, and may process the modified tensor, with the decoder model, to generate a caption for the video based on attributes associated with the video. The device may perform one or more actions based on the caption for the video.

20 Claims, 9 Drawing Sheets

(56) References Cited

U.S. PATENT DOCUMENTS

| | | | | |
|---|---|---|---|---|
| 2021/0295093 A1* | 9/2021 | Pan | G06V 10/82 | |
| 2021/0357670 A1* | 11/2021 | Wu | G06V 20/56 | |
| 2022/0014807 A1* | 1/2022 | Lin | G06N 3/044 | |
| 2023/0245467 A1* | 8/2023 | Mori | G06V 20/625 | 382/103 |
| 2023/0271618 A1* | 8/2023 | Chandra | B60W 40/109 | 701/1 |

OTHER PUBLICATIONS

Jiang, Wenhao, et al. "Recurrent Fusion Network for Image Captioning." arXiv preprint arXiv:1807.09986 (2018).https://arxiv.org/abs/1807.09986 (Year: 2018).*

Chen et al., "Deep learning for video captioning: A review", Twenty-Eighth International Joint Conference on Artificial Intelligence (IJCAI), Aug. 2019, pp. 6283-6290, IJCAI, Macao, China.

"Global status report on road safety 2018: Summary", World Health Organization—Social Determinants of Health, Jun. 17, 2018, pp. 1-403, WHO, Switzerland.

Kim et al., "Textual explanations for self-driving vehicles", in Proceedings of the European conference on computer vision (ECCV), Jul. 30, 2018, pp. 577-593, Springer Verlag, Munich, Germany.

Hankey et al., "Description of the SHRP 2 naturalistic database and the crash, near-crash, and baseline data sets," Prepared for the Strategic Highway Research Program 2 Transportation Research Board of The National Academies, Apr. 1, 2016, pp. 1-58, Virginia Tech Transportation Institute, USA.

Venugopalan et al., "Translating videos to natural language using deep recurrent neural networks," ACL Anthology, Proceedings of the 2015 Conference of the North {A}merican Chapter of the Association for Computational Linguistics: Human Language Technologies, May-Jun. 2015, 1494-1504, Association for Computational Linguistics, Denver, Colorado, USA.

Pan et al., "Jointly modeling embedding and translation to bridge video and language," IEEE Conference on Computer Vision and Pattern Recognition (CVPR), Dec. 12, 2016, pp. 4594-4602, IEEE, Las Vegas, NV, USA.

Venugopalan et al., "Sequence to sequence-video to text," IEEE International Conference on Computer Vision (ICCV), Dec. 7-13, 2015, pp. 4534-4542, IEEE, Santiago, Chile.

Yao et al., "Describing videos by exploiting temporal structure," IEEE International Conference on Computer Vision (ICCV), Dec. 7-13, 2015, pp. 4507-4515, IEEE, Santiago, Chile.

Yu et al., "Video paragraph captioning using hierarchical recurrent neural networks," IEEE Conference on Computer Vision and Pattern Recognition (CVPR), Jun. 27-30, 2016, pp. 4584-4593, IEEE, Las Vegas, NV, USA.

Simoncini et al., "Unsafe maneuver classification from dashcam video and gps/imu sensors using spatio-temporal attention selector," IEEE Transactions on Intelligent Transportation Systems, 2021,—Recheck (Not found, similar to citation No. 16).

Zhou et al., "Grounded video description", IEEE/CVF Conference on Computer Vision and Pattern Recognition (CVPR), Jun. 15-20, 2019, pp. 6571-6580, IEEE, Long Beach, CA, USA.

Anderson et al., "Bottom-up and top-down attention for image captioning and visual question answering," IEEE/CVF Conference on Computer Vision and Pattern Recognition (CVPR), Jun. 18-23, 2018, pp. 6077-6086, IEEE, Salt ake City, UT, USA.

Herdade et al., "Image captioning: Transforming objects into words," 33rd Conference on Neural Information Processing Systems (NeurIPS), Jun. 14, 2019, pp. 1-11, NeurIPS, Vancouver, Canada.

Lei et al., "Tvqa+: Spatiotemporal grounding for video question answering," Proceedings of the 58th Annual Meeting of the Association for Computational Linguistics, Apr. 25, 2019, pp. 8211-8225, Association for Computational Linguistics, USA.

Lu et al., "Neural baby talk," IEEE/CVF Conference on Computer Vision and Pattern Recognition, Jun. 18-23, 2018, pp. 7219-7228, IEEE, Salt Lake City, UT, USA.

Simoncini et al., "Two-stream neural architecture for unsafe maneuvers classification from dashcam videos and gps/imu sensors," IEEE 23rd International Conference on Intelligent Transportation Systems (ITSC), Sep. 20-23, 2020, pp. 1-6, IEEE, Rhodes, Greece.

Kubin et al., "Deep crash detection from vehicular sensor data with multimodal self-supervision," IEEE Transactions on Intelligent Transportation Systems, Oct. 8, 2021, pp. 1-10, IEEE.

Vaswani et al., "Attention is all you need," Proceedings of the 31st International Conference on Neural Information Processing Systems, Jun. 12, 2017, pp. 6000-6010, Long Beach, NeurIPS, CA, USA.

Yao et al., "Boosting image captioning with attributes", IEEE International Conference on Computer Vision (ICCV), Oct. 22-29, 2017, pp. 4904-4912, IEEE, Venice, Italy.

Pan et al., "Video captioning with transferred semantic attributes," IEEE Conference on Computer Vision and Pattern Recognition (CVPR), Jul. 21-26, 2017, pp. 984-992, IEEE, Honolulu, USA.

Wang et al., "Dense-captioning events in videos: Sysu submission to activitynet challenge 2020," 5th International Conference on Computational Intelligence and Applications (ICCIA), Jun. 21, 2020, pp. 1-4.

Krishna et al., "Dense-captioning events in videos," International Conference on Computer Vision (ICCV), Oct. 22-29, 2017, pp. 706-715, IEEE, Venice, Italy.

Taccari et al., "Classification of crash and near-crash events from dashcam videos and telematics," 21st International Conference on Intelligent Transportation Systems (ITSC), Nov. 4-7, 2018, pp. 2460-2465, IEEE, Maui, HI, USA.

Pedregosa et al., "Scikit-learn: Machine learning in Python," Journal of Machine Learning Research, Oct. 2011, pp. 2825-2830, 12(85), JMLR, USA.

Banerjee et al., "Meteor: An automatic metric for MT evaluation with improved correlation with human judgments," Proceedings of the ACL Workshop on Intrinsic and Extrinsic Evaluation Measures for Machine Translation and/or Summarization, Jun. 2005, pp. 65-72, Association for Computational Linguistics, Michigan, USA.

Hochreiter et al., "Long short-term memory," Neural computation, Nov. 15, 1997, pp. 1735-1780, 9(8), MIT Press Direct, USA.

Bengio et al., "Scheduled sampling for sequence prediction with recurrent neural networks," Proceedings of the 28th International Conference on Neural Information Processing Systems, Dec. 7, 2015, pp. 1171-1179, 1, NIPS, USA.

Ren et al., "Faster r-cnn: Towards real-time object detection with region proposal networks," Proceedings of the 28th International Conference on Neural Information Processing Systems, Jun. 4, 2015, pp. 91-99, 1, NIPS, USA.

He et al., "Deep residual learning for image recognition," IEEE Conference on Computer Vision and Pattern Recognition (CVPR), Jun. 27-30, 2016, pp. 770-778, IEEE, Las Vegas, NV, USA.

Kingma et al., "Adam: A method for stochastic optimization," Published as a conference paper at ICLR, 2015, pp. 1-13, Ithaca, NY, USA.

Papineni et al., "Bleu: a method for automatic evaluation of machine translation," Proceedings of the 40th Annual Meeting on Association for Computational Linguistics, Jul. 6, 2002, pp. 311-318, ACM, Philadelphia, USA.

Lin et al., "Rouge: A package for automatic evaluation of summaries," Workshop on Text Summarization Branches Out, Post-Conference Workshop of ACL, Jul. 25-16, 2004, pp. 74-81, Association for Computational Linguistics, Barcelona, Spain.

* cited by examiner

SYSTEMS AND METHODS FOR VIDEO CAPTIONING SAFETY-CRITICAL EVENTS FROM VIDEO DATA

BACKGROUND

Video captioning is the task of automatically generating natural language descriptions of videos, and may include a combination of computer vision and language processing. Practical applications of video captioning include determining descriptions for video retrieval and indexing, and helping people with visual impairments.

DETAILED DESCRIPTION OF EXAMPLE EMBODIMENTS

Figure 1A:
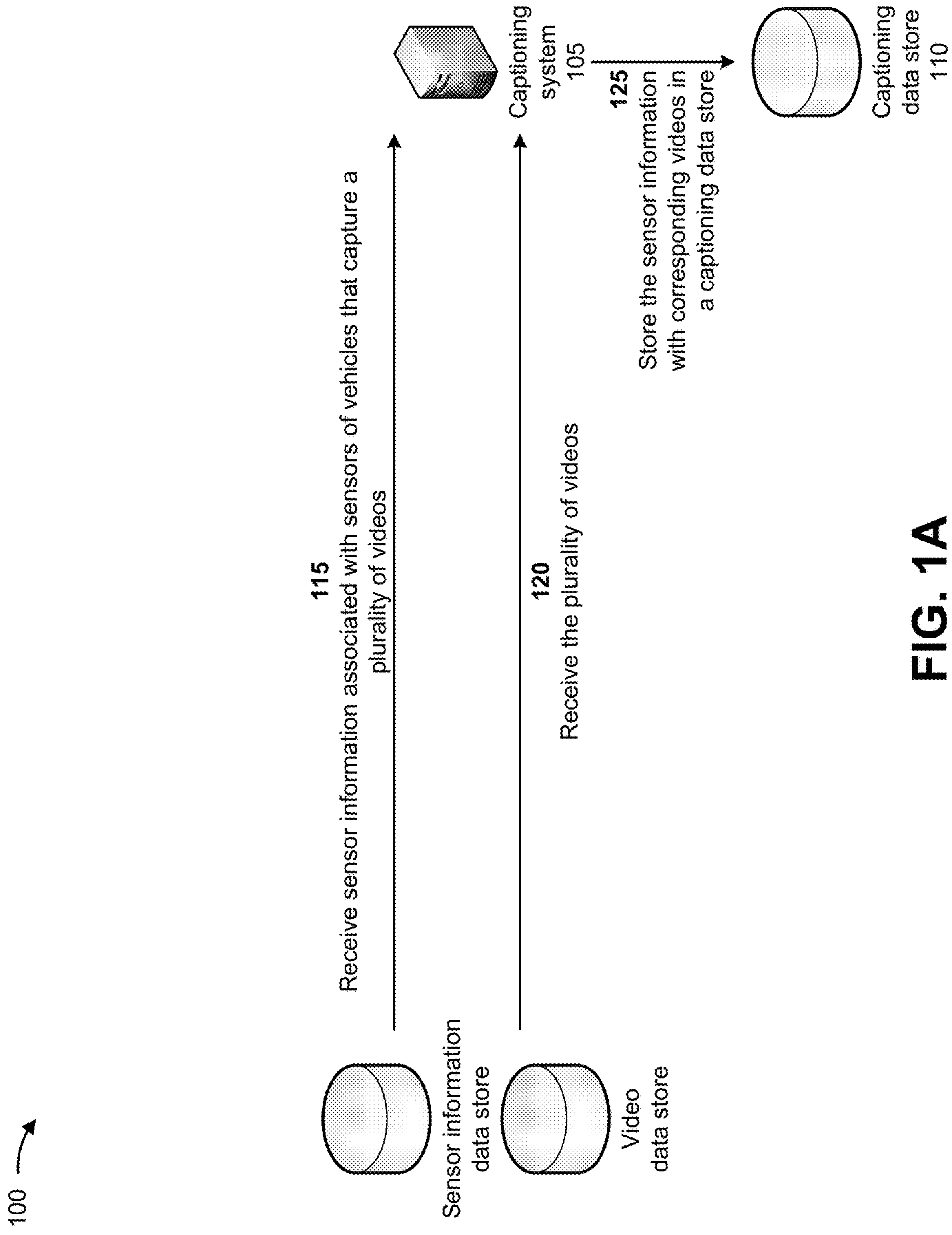
FIGS. 1A-1F are diagrams of an example associated with video captioning safety-critical events from video data.

The following detailed description of example implementations refers to the accompanying drawings. The same reference numbers in different drawings may identify the same or similar elements.

Road safety and safety-critical events (e.g., crashes and near-crashes) are of significant importance, as vehicle safety systems have been shown to actively contribute to the reduction of traffic-related deaths and serious injuries. However, current video captioning techniques apply inaccurate captions or fail to apply captions to videos associated with vehicle operation, require an inordinate quantity of time for individuals to label each frame of a video (e.g., of a crash or a near-crash). Thus, current video captioning techniques fail to generate human-understandable captions of an unsafe situation in a driving scenario (e.g., a crash or a near-crash) from a video acquired from a dashcam mounted inside one of the vehicles and based on vehicle sensor data (e.g., received from global positioning system (GPS) and/or inertial motion unit (IMU) sensors). Thus, current video captioning techniques consume computing resources (e.g., processing resources, memory resources, communication resources, and/or the like), networking resources, and/or other resources associated with failing to generate video captions for safety-critical events, failing to prevent traffic-related deaths and serious injuries, emergency handling of preventable traffic-related deaths and serious injuries, handling legal consequences of preventable traffic-related deaths and serious injuries, and/or the like.

Some implementations described herein provide a captioning system that video captions safety-critical events from video data. For example, the captioning system may receive a video and corresponding sensor information associated with a vehicle, and may extract feature vectors associated with the corresponding sensor information and an appearance and a geometry of another vehicle captured in the video. The captioning system may generate a tensor (e.g., an object that describes a multilinear relationship between sets of objects related to a vector space) based on the feature vectors, and may process the tensor, with a convolutional neural network model, to generate a modified tensor. The captioning system may select a decoder model from a plurality of decoder models, and may process the modified tensor, with the decoder model, to generate a caption for the video based on attributes associated with the video. The captioning system may perform one or more actions based on the caption for the video.

In this way, the captioning system video captions safety-critical events from video data. For example, the captioning system may include an encoder-decoder architecture. The encoder may be utilized to classify safety-critical driving events in videos. Four different types of decoders may be utilized to generate captions for the videos based on the classification of the safety-critical driving events output by the encoder. The captioning system may apply captions to videos associated with vehicle operation and safety-critical events, and may utilize contextual information (e.g., a presence or an absence of a crash and an unsafe maneuver type) to further improve the generated captions. Thus, the captioning system may conserve computing resources, networking resources, and/or other resources that would have otherwise been consumed by failing to generate video captions for safety-critical events, failing to prevent traffic-related deaths and serious injuries, emergency handling of preventable traffic-related deaths and serious injuries, handling legal consequences of preventable traffic-related deaths and serious injuries, and/or the like.

FIGS. 1A-1F are diagrams of an example 100 associated with video captioning safety-critical events from video data. As shown in FIGS. 1A-1F, example 100 includes a captioning system 105, a captioning data store 110, a sensor information data store, and a video data store. Further details of the captioning system 105, the captioning data store 110, the sensor information data store, and the video data store are provided elsewhere herein.

As shown in FIG. 1A, and by reference number 115, the captioning system 105 may receive sensor information associated with sensors of vehicles that capture a plurality of videos. For example, the vehicles may include sensors, such as global positioning system (GPS) sensors, inertial measurement unit (IMU) sensors, gyroscopes, crash detection sensors, and/or the like that collect the sensor information for the vehicles. The sensor information may include information identifying speeds of the vehicles, accelerations of the vehicles, orientations of the vehicles, whether the vehicles were involved in a crash or a near crash, and/or the like during the capture of the plurality of videos. The vehicles may provide the sensor information for storage in the sensor information data store (e.g., a database, a table, a list, and/or the like). The captioning system 105 may periodically receive the sensor information from the sensor information data store, may continuously receive the sensor information from the sensor information data store, may receive the sensor information based on providing a request for the sensor information to the sensor information data store, and/or the like.

As further shown in FIG. 1A, and by reference number 120, the captioning system 105 may receive the plurality of videos. For example, the vehicles may include cameras (e.g., dashcams, rear cameras, side cameras, and/or the like) that capture the plurality of videos for the vehicles. Each of the plurality of videos may include a two-dimensional representation of a scene captured by a corresponding one of the cameras over a time period. Each of the plurality of cameras may capture one or more videos of a scene over a time period and may provide the captured videos for storage in the video data store (e.g., a database, a table, a list, and/or the like) for storage. For example, a camera may capture a first video of a roadway for one hour and may provide the first video to the video data store. The camera may capture a second video of the roadway for a subsequent hour and may provide the second video to the video data store. Thus, the camera may capture and store twenty-four videos per day in the video data store. The captioning system 105 may periodically receive one or more of the plurality of videos from the video data store, may continuously receive one or more of the plurality of videos from the video data store, may receive the one or more of the plurality of videos based on providing a request for the one or more of the plurality of videos to the video data store, and/or the like.

As further shown in FIG. 1A, and by reference number 125, the captioning system 105 may store the sensor information with corresponding videos in the captioning data store 110. For example, the sensor information may include identifiers associated with the vehicles, and each of the plurality of videos may be associated with a vehicle identifier. Thus, the captioning system 105 may map the sensor information with corresponding videos based on the vehicle identifiers associated with the vehicles. The captioning system 105 may store the sensor information, the plurality of videos, and the mapping of the sensor information with corresponding videos in the captioning data store 110 (e.g., a database, a digital ledger, and/or the like).

In some implementations, a dataset stored in the captioning data store 110 may include the plurality of videos (e.g., where each video includes 450 frames at 15 frames per second (fps) with a resolution of 480×356), associated with events (e.g., crashes, near-crashes, and/or the like), and the sensor information (e.g., with a sampling frequency of 1-10 Hertz). Each of the videos may capture an event from different angles (e.g., front-facing, rear-facing, and driving-facing). However, the captioning system 105 may utilize a front-facing camera angle (e.g., a dashcam video) since such an angle is the most common and widely used set up in commercial scenarios.

In some implementations, the captioning system 105 may annotate the events with a set of temporally ordered sentences. Such sentences may include a single action (i.e., a verb) in present simple tense, while a subject may include a subject vehicle (SV), other vehicles in a scene (e.g., V2, V3, and V4), or other actors (e.g., pedestrians, bicycles, animals, and/or objects). A set of temporally ordered sentences may include one or more sentences describing an environment (e.g., a presence of an intersection or a stop sign, a presence and position of other relevant entities in the scene, and/or the like); one or more sentences describing the events or the maneuvers computed by various subjects (e.g., changing lanes, going through an intersection, traffic light changing, losing control of a vehicle, and/or the like); one or more sentences describing the event itself and reactions that the actors involved had with respect to the event (e.g., braking, steering in the adjacent lane, and/or the like); and one or more sentences describing what happened after the event (e.g., the actors continued driving or remained stopped). As a quantity of verbs and nouns describing an event on a roadway is limited, a total quantity of distinct words may be small (e.g., 576 words). On the other hand, due to the complexity of safety-critical events, a larger quantity of sentences may be provided in order to have a complete description (e.g., 17,647 sentences for 2,982 annotations, with an average of roughly 6 sentences per annotation). In some implementations, the dataset may include approximately 3,000 multi-sentence descriptions of crash or near-crash events.

In some implementations, the captioning system 105 may replace an instance-specific part of a sentence with a placeholder, such as replacing the actors (SV, V2, V3, and V4) with the term "subject" (SBJ) and directions (e.g., left and right) with the term "DIRECTION." The captioning system 105 may execute an agglomerative clustering model with an inverse of a metric for evaluation of translation with explicit ordering (METEOR) score (e.g., a metric for the evaluation of machine translation output) as a distance. The captioning system 105 may determine a threshold for a quantity of clusters to select (e.g., 1,500) to provide a best silhouette score. The most frequent sentences may include sentences describing an event itself, in a form (e.g., SBJ brakes or SBJ brakes to avoid a collision with SBJ). The most common sentences may include sentences describing an environment (e.g., SBJ is the leading vehicle or SBJ approaches an intersection), and sentences describing a potentially non-dangerous maneuver (e.g., SBJ turns DIRECTION and SBJ change lanes to the DIRECTION).

Figure 1B:
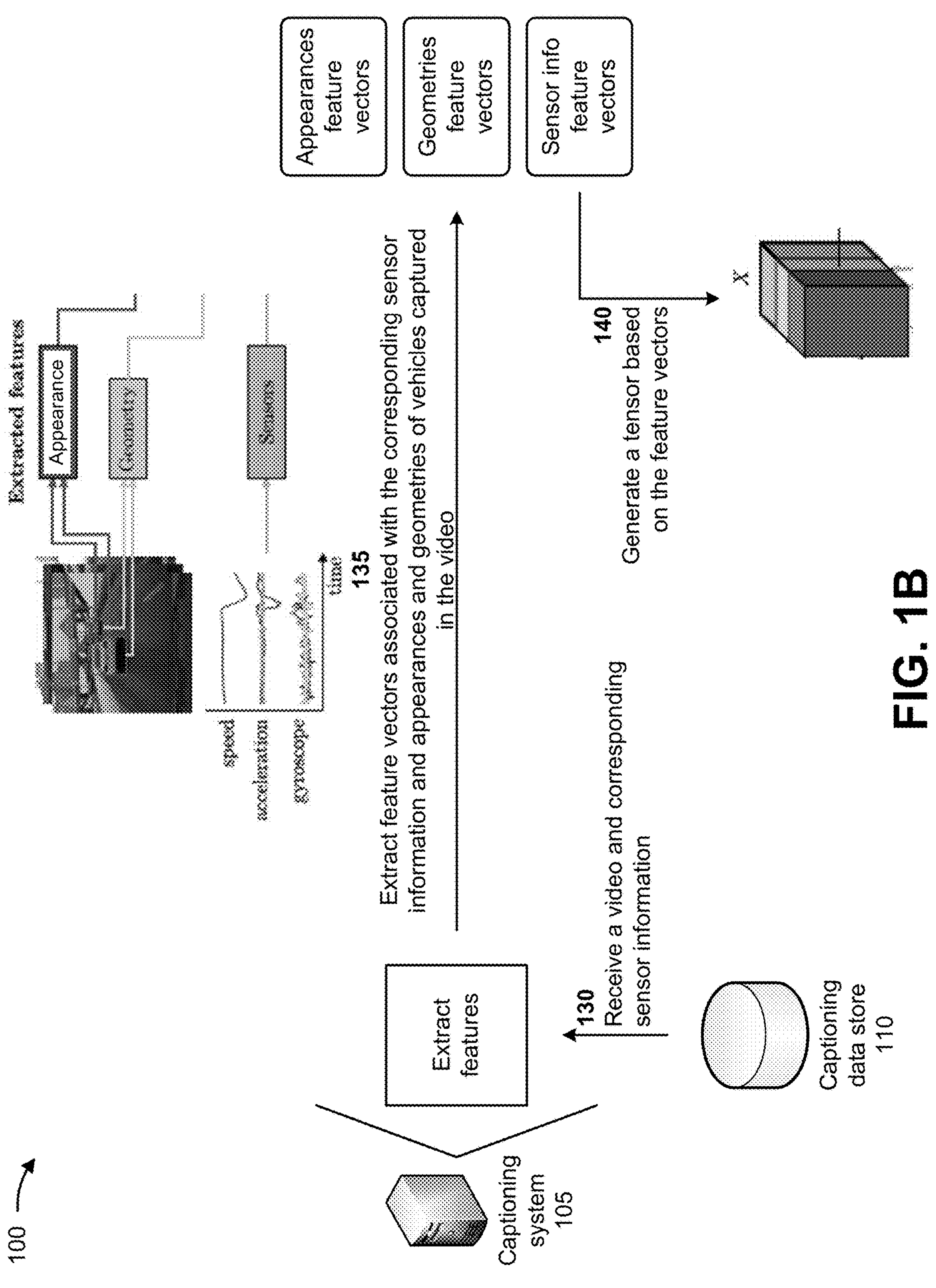

As shown in FIG. 1B, and by reference number 130, the captioning system 105 may receive a video and corresponding sensor information from the captioning data store 110. For example, the captioning system 105 may provide a request for a video to the captioning data store 110. The request may include information identifying the video. In some implementations, the request may include a request for any of the plurality of videos stored in the captioning data store 110. The captioning data store 110 may retrieve the video based on the request and may retrieve the corresponding sensor information based on the mapping of the sensor information with corresponding videos. The captioning data store 110 may provide the video and the corresponding sensor information to the captioning system 105, and the captioning system 105 may receive the video and the corresponding sensor information from the captioning data store 110. The corresponding sensor information may include the sensor information associated with the vehicle that captured the video.

As further shown in FIG. 1B, and by reference number 135, the captioning system 105 may extract feature vectors associated with the corresponding sensor information and appearances and geometries of vehicles captured in the video. For example, the captioning system 105 may utilize an encoder-decoder architecture to generate captions for the plurality of videos. The encoder may receive the corresponding sensor information, the video, and the appearances and geometries of the vehicles captured in the video. The appearances and geometries of the vehicles may be generated by an object detection model associated with the captioning system 105. The captioning system 105 may process frames of the video, with the object detection model, to generate the appearances and geometries of the vehicles captured in the video.

The encoder of the captioning system 105 may produce feature vectors relative to an evolution of each object (e.g., vehicle) in a scene over several consecutive frames of the video. The feature vectors extracted from the object detection outputs allow the decoder of the captioning system 105 to model output explicitly on entities in the scene. In some implementations, the encoder may utilize an object tracking model to extract feature vectors of the same real object (e.g., a vehicle) over time, may combine two heterogeneous inputs (e.g., the video and the sensor information) in an effective way, and may generate feature vectors that are pre-trained on a safety-critical event classification task (e.g., which aids in generating a caption for the video).

The video may include T frames, a set (e.g., $o_t=\{o_{t,1}, \ldots, o_{t,N_t}\}$) of objects detected in a frame $t\in\{1, \ldots, T\}$, with $N_t$ corresponding to a total quantity of objects detected in the frame t and with an i-th object $o_{t,i}$ detected in the frame t. The i-th object $o_{t,i}$ may be associated with a same real object (e.g., the same vehicle) for each frame t. In some implementations, the encoder may consider a maximum quantity of detections $N_t$ for each frame t. Alternatively, instead of considering a maximum quantity of detections $N_t$ for each frame t, the encoder may consider a fixed quantity of detections $N_{objs}$ for each frame t, padding with zeros if there are fewer detections and discarding exceeding detections based on a track volume (e.g., a sum of all detections of an object for each frame). Thus, the objects may form a matrix O of size $T\times N_{objs}$, with $o_{t,i}$ being zero if the i-th object is not present in frame t. To obtain this matrix, the encoder may utilize a model (e.g., a greedy tracking model, an approximation model, a dynamic programming model, and/or the like) based on object classes and overlapping areas in two consecutive frames.

For each object $o_{t,i}$, the encoder may extract two feature vectors, $$x^a_{t,i} \text{ and } x^g_{t,i},$$

respectively associated with an appearance and a geometry of the object. The encoder may determine the appearance feature vector for each object by pooling an output of a ResNet-50 backbone pre-trained on an unsafe maneuver classification task via an RoI-pooling layer. The geometry feature vector may include a normalized position of a top left corner of a box, a normalized width and height of the box, a confidence of the detection, and a one-hot encoded vector indicating a class of the object. The encoder may extract a third feature vector (e.g., a sensor information feature vector)

$$x^s_{t,i}$$

based on the corresponding sensor information and utilizing a two-dimensional depth-wise separable convolution in order to preserve a single-sensor semantic. The encoder may perform the aforementioned steps for each object in the video to generate appearance feature vectors, geometries feature vectors, and sensor information feature vectors for the video.

As further shown in FIG. 1B, and by reference number 140, the captioning system 105 may generate a tensor based on the feature vectors. For example, the encoder of the captioning system 105 may generate a tensor X based on the feature vectors. In some implementations, the encoder may generate the tensor X of shape $T\times N_{objs}\times c$, where c corresponds to a feature dimension and each element $x_t$, may be formed by concatenating the three feature vectors on the feature dimension, as follows:

$$x_{t,i} = \left[x^a_{t,i} \,|\, x^g_{t,i} \,|\, x^s_{t,i}\right].$$

Figure 1C:
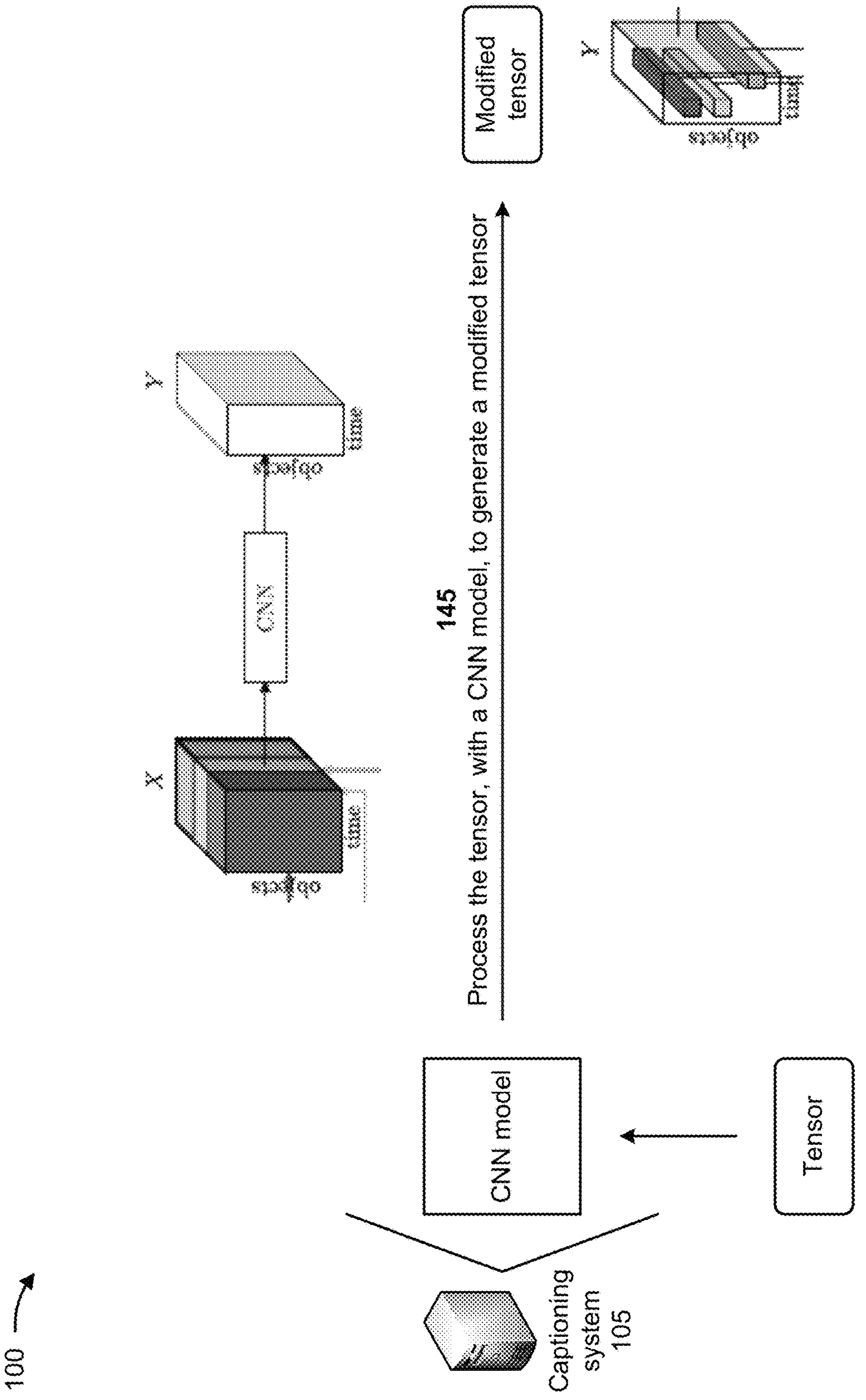

As shown in FIG. 1C, and by reference number 145, the captioning system 105 may process the tensor, with a model (e.g., a neural network model, such as a convolutional neural network (CNN) model), to generate a modified tensor. For example, the encoder of the captioning system 105 may process the tensor X, with the CNN model, to generate the modified tensor Y. In some implementations, the encoder may process the tensor X with a set of convolution operations followed by activations (e.g., via an activation model, such as a rectified linear unit (ReLU) activation model) and max-pooling operations, while gradually increasing the feature dimension and reducing a temporal dimension. The convolutional filters may include a size of 3×1 while the max-pooling operations may include a size of 2×1. Thus, the encoder may extract features by looking at a single object in a local temporal interval and may never mix different object features. Utilizing a convolution filter that combines adjacent objects would depend on an order of the objects in the tensor, which is arbitrary. Also, the extracted features may still retain an original object semantic meaning (e.g., making it possible to link a feature to a given object over a given temporal span). The modified tensor Y may include a shape of $T'\times N_{objs}\times c'$, where T' may correspond to a newly reduced temporal dimension and c' may correspond to a new feature dimension.

Figure 1D:
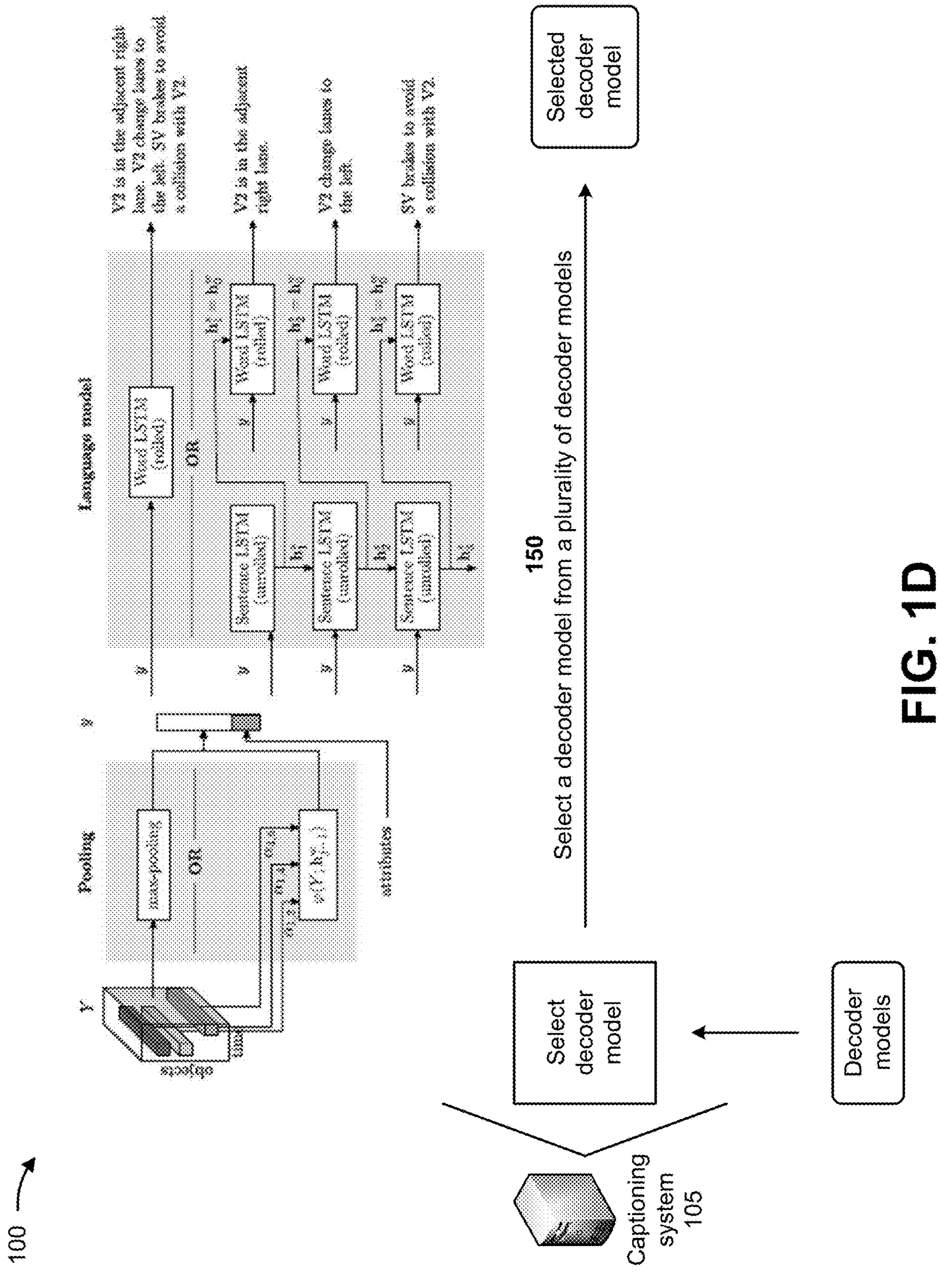

As shown in FIG. 1D, and by reference number 150, the captioning system 105 may select a decoder model from a plurality of decoder models based on a quality of a caption to be generated by the captioning system 105 and/or based on the encoder utilized by the captioning system 105. For example, the plurality of decoder models may include a single-loop decoder model with pooling, a single-loop decoder model with attention, a hierarchical decoder model with pooling, a hierarchical decoder model with attention, and/or the like. Thus, the captioning system 105 may select, as the decoder model, one of the single-loop decoder model with pooling, the single-loop decoder model with attention, the hierarchical decoder model with pooling, or the hierarchical decoder model with attention.

The captioning system 105 may utilize the decoder model to translate a representation (e.g., the modified tensor Y) produced by the encoder into human-readable text. At a core of the decoder model may be a neural network model, such as a recurrent neural network (RNN) model, trained to predict a next word based on the output of the encoder (e.g., the modified tensor Y) and based on a previous internal state of the RNN. For paragraph captioning, the decoder model may utilize hierarchical RNN models, such as two asynchronous RNN models (e.g., a sentence RNN model and a word RNN model). The sentence RNN model may store information of the produced sentences and may be triggered at a start of every sentence, producing an initial state of the word RNN model. The word RNN model may be trained to produce a next word, similar to a single-loop decoder model. Moreover, the output of the encoder (e.g., the modified tensor 1) is a feature tensor that includes the objects over different segments, that has to be reduced to a single vector to be handled by the decoder model. The feature tensor may be reduced to the single vector by a simple pooling layer or based on utilizing attention.

The plurality of decoder models may be based on long short-term memory (LSTM) cells. An LSTM operation may be referred to with a notation, $h_t=\text{LSTM}(x_t, h_{t-1})$, where $x_t$ and $h_t$ respectively correspond to an LSTM input vector and an LSTM output vector at a time t. Variables associated with the memory cells may be omitted for notational convenience. Ground truth captions for each annotation W may be defined as:

$$W = \{W_0, W_1, \ldots, W_{N_p}\}$$

$$W_i = \{w_0^i, w_1^i, \ldots, w_{N_s^i}^i\},$$

where $W_i$ corresponds to an i-th sentence of the annotation W, $$w_j^i$$

corresponds to a j-th word of the sentence $W_i$, $N_p$ corresponds to a quantity of sentences in the annotation W, and $$N_s^i$$

corresponds to a quantity of words in the i-th sentence of the annotation W. Concatenations ($\overline{W}$) of the words $$w_j^i$$

for each sentence $W_i$ of the annotation W may be defined as:

$$\overline{W} = \{W_0 | W_1 | \ldots | W_{N_p}\} = \{\overline{w}_0, \overline{w}_1, \ldots, \overline{w}_{\overline{N}}\},$$

$$\text{where } \overline{N} = \sum_i N_s^i.$$

The single-loop decoder model with pooling may receive the modified tensor Y, and may apply a two-dimensional max-pooling operation to reduce the temporal dimension and the object dimension and to compress the modified tensor Y into a single context vector. The max-pooling operation may be effective at identifying an unsafe maneuver event or task. The single-loop decoder model with pooling may apply a max-pooling operation over the first two dimensions of the modified tensor Y, and may apply a fully-connected layer of size $d^e$ followed by a ReLU activation to generate a feature vector y. The single-loop decoder model with pooling may iteratively perform, for each word $\overline{w}_j$ in a ground truth sentence $\overline{W}$, a word embedding on the word $\overline{W}_J$ of size $d^w$, may concatenate the word embedding to the context vector y, and may provide the results to a single LSTM layer of size $d^d$, as follows:

$$h_j = LSTM^w(y \,|\, \text{embedding}(\overline{w}_j), h_{j-1}).$$

The single-loop decoder model with pooling may provide $h_j$ to a linear layer for a size of a vocabulary and may be trained to predict a following word $\overline{w}_{j+1}$ with a standard cross entropy loss.

The single-loop decoder model with attention may utilize dot-product attention to dynamically generate the context vector y. An architecture of the single-loop decoder model with attention may be identical to the single-loop decoder model with pooling, with one exception. The single-loop decoder model with attention may process the modified tensor Y and a previous hidden state of a decoder LSTM $h_{j-1}$ to generate the context vector y as a weighted sum:

$$y = \varphi(Y; h_{j-1}) = \sum_{t,i} \alpha_{t,i} y_{t,i},$$

where:

$$\sum_{t,i} \alpha_{t,i} = 1,$$

$$\alpha_{t,i} = \frac{\exp(e_{t,i,j})}{\sum_{t,i} \exp(e_{t,i,j})},$$

$$e_{t,i,j} = f(h_{j-1}, y_{t,i}),$$

and f corresponds to a similarity function that includes a projection of the two factors $h_{j-1}$ and $y_{t,i}$ to a common dimension $d^a$ using a linear operation and a dot-product operation.

The hierarchical decoder model with pooling may include two nested and asynchronous LSTM operations: a first LSTM operation triggered at a beginning of each sentence of the annotation, and a second LSTM operation for each word, as in the single-loop decoder models. The sentence LSTM may oversee a generation process by keeping track of which sentence has been predicted and by postponing generation of a next sentence to the word LSTM, by generating an initial internal state $$h_0^w.$$

The hierarchical decoder model with pooling may process the modified tensor Y to generate the context vector y (e.g., similar to the single-loop decoder model with pooling). For each sentence $\overline{W}_i$ of W, the context vector y may be provided to the sentence LSTM for processing, as follows:

$$h_t^s = LSTM^s(y, h_{t-1}^s),$$

and, for each word $$w_j^i$$

of the sentence $W_i$, the hierarchical decoder model with pooling may perform the following operation (e.g., with $$h_0^w = h_t^s):$$

$$h_j = LSTM^w(y \,|\, \text{embedding}(\overline{w}_j), h_{j-1}).$$

The hierarchical decoder model with attention may be similar to the hierarchical decoder model with pooling, but may compute the context vector y for the word LSTM using dot-product attention, as described above in connection with the single-loop decoder model with attention. As for the context vector y of the sentence LSTM, the hierarchical decoder model with attention may maintain the max-pooling operation over the modified tensor Y, as described above for the pooling decoders. A portion of the hierarchical decoder model with attention may review an entire event (e.g., all objects identified at a particular time).

Figure 1E:
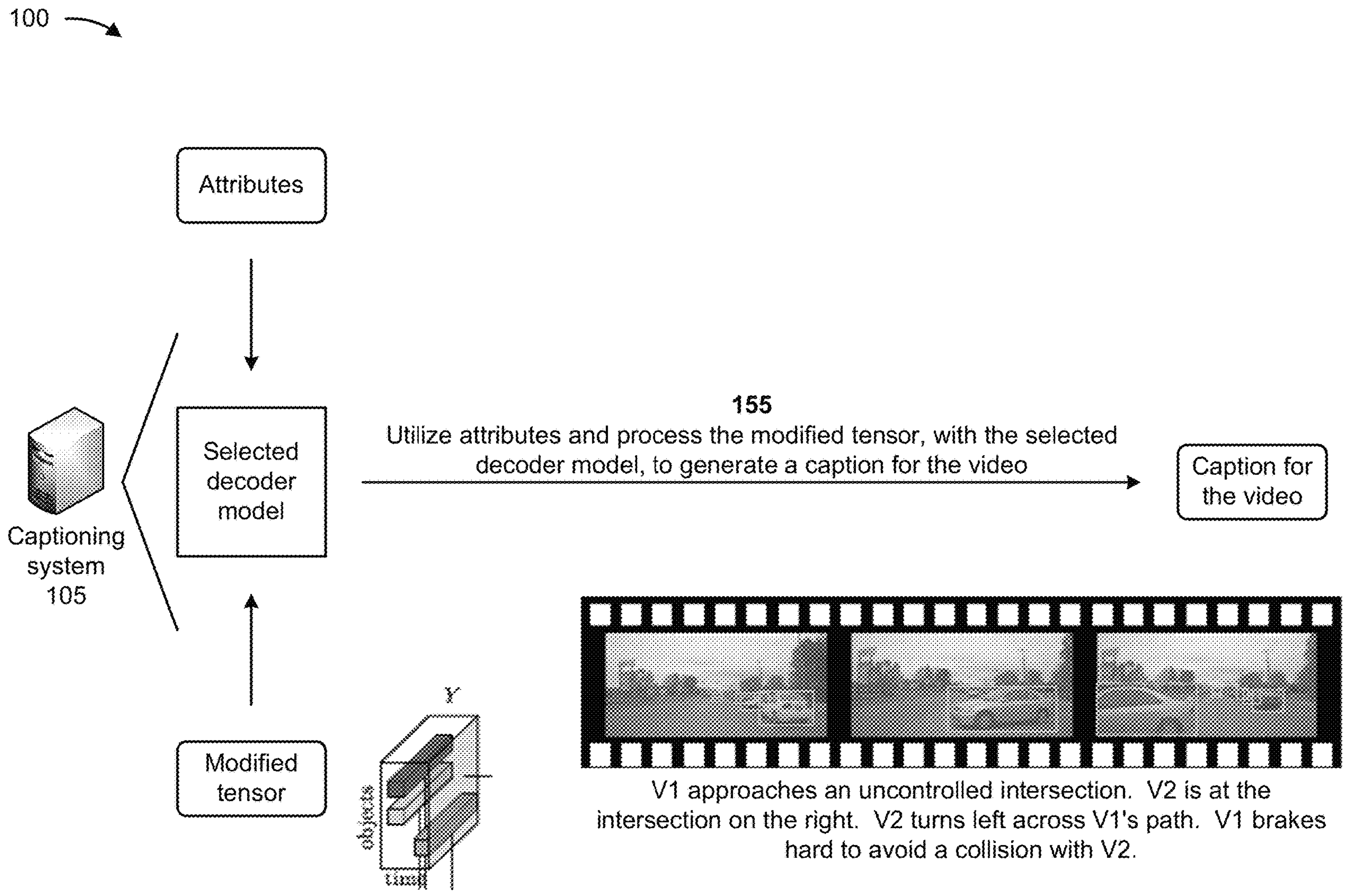

As shown in FIG. 1E, and by reference number 155, the captioning system 105 may utilize attributes and may process the modified tensor, with the selected decoder model, to generate a caption for the video. For example, the captioning system 105 may receive the attributes from the sensor information data store, the video information data store, and/or a third-party source. The attributes may include attributes associated with a caption domain (e.g., a vehicle domain, a traffic domain, and/or the like), attributes learned from annotations, and/or the like. The captioning system 105 may utilize the attributes to improve the caption generated for the video. In one example, the attributes may include attributes associated with safety-critical events (e.g., a crash event or a near-crash event), types of unsafe maneuvers that cause the events, and/or the like. The selected decoder model may utilize the attributes to adjust a probability of the words to be utilized in the generated caption for the video. For example, if the attributes indicate that a particular safety-critical event is a crash, the captioning system 105 may increase a probability of particular words (e.g., "collides" or "hits") in the caption and may decrease a probability of other words (e.g., "avoid" or "resume"). The attributes may also prevent the selected decoder model from generating severe errors in the caption (e.g., predicting a caption describing a near-crash for a video with a severe crash).

The captioning system 105 may process the modified tensor Y, with the selected decoder model, to generate the caption for the video. For example, the captioning system 105 may generate the caption for the video depending on the selected decoder model, as described above in connection with FIG. 1D. As further shown in FIG. 1E, the caption for the video may indicate that "V1 approaches an uncontrolled intersection. V2 is at the intersection on the right. V2 turns left across V1's path. V1 brakes hard to avoid a collision with V2." In some implementations, the different decoder models may generate difference captions for the video. For example, for an event associated with an unsafe lane change, the single-loop decoder model with pooling may generate the following caption: "V2 is ahead in the adjacent right lane. V2 begins to change lanes to the left into SV's lane. SV brakes hard to avoid a rear-end collision with V2. V2 steers right back into its original lane. SV continues on." The single-loop decoder model with attention may generate the following caption: "V2 is ahead in the adjacent right lane. V2 begins to change lanes to the left into SV's lane. SV brakes hard to avoid a rear-end collision with V2. V2 continues on." The hierarchical decoder model with pooling may generate the following caption: "V2 is ahead in the adjacent right lane. V2 change lanes to the left into SV's lane. SV brakes hard to avoid a rear-end collision with V2. V2 completes the lane change. SV continues on." The hierarchical decoder model with attention may generate the following caption: "V2 is ahead in the adjacent right lane. V2 begins to change lanes to the left into SV's lane. SV brakes hard to avoid a rear-end collision with V2. Both vehicles continue on."

Figure 1F:
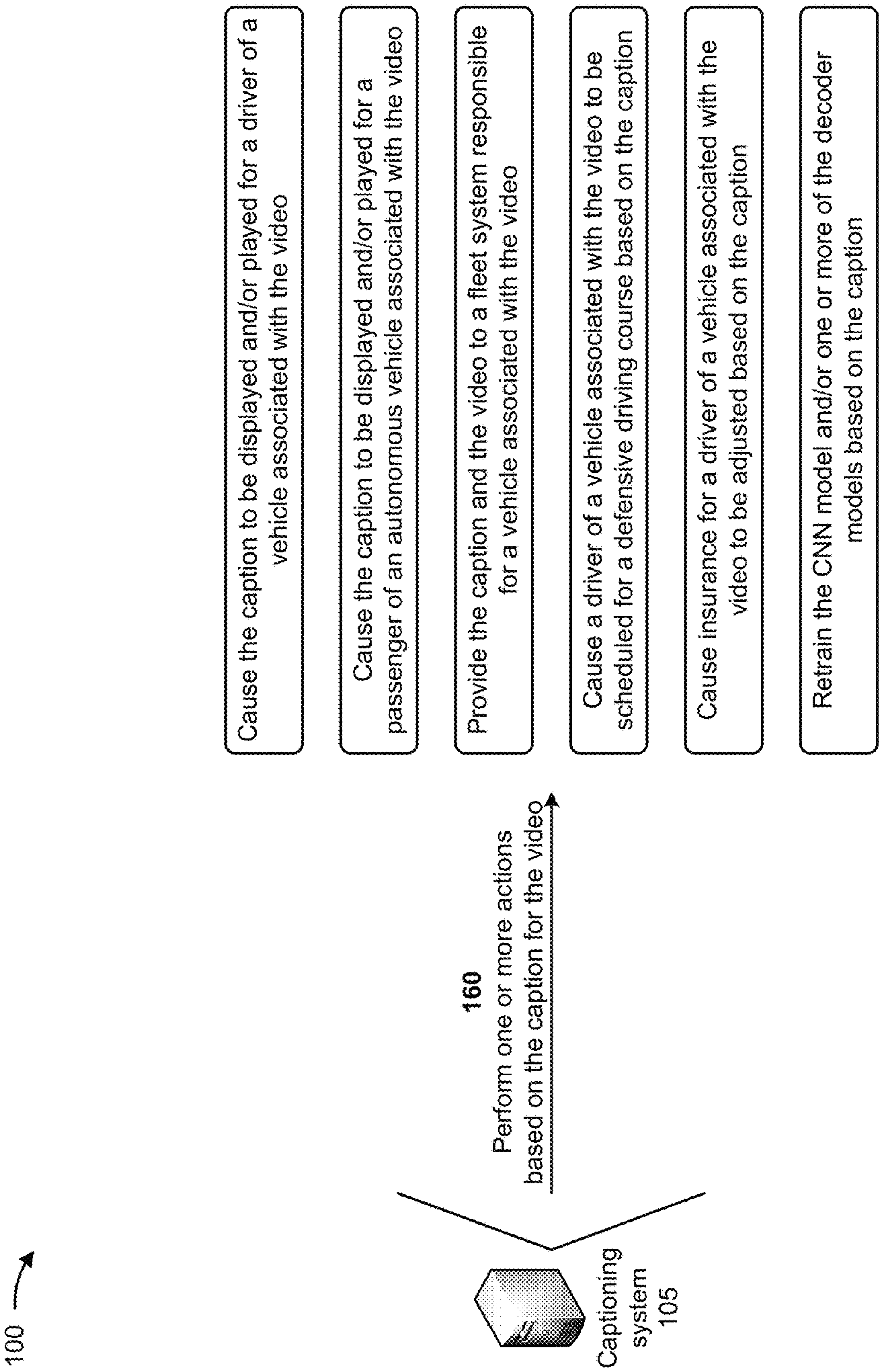

As shown in FIG. 1F, and by reference number 160, the captioning system 105 may perform one or more actions based on the caption for the video. In some implementations, performing the one or more actions includes the captioning system 105 causing the caption to be displayed and/or played for a driver of a vehicle associated with the video. For example, the captioning system 105 may provide the caption in textual format and/or audio format to the vehicle associated with the video. An infotainment system of the vehicle may receive the caption in the textual format and may display the caption to the driver of the vehicle. The infotainment system may also play the audio of the caption for the driver. In this way, the captioning system 105 conserves computing resources, networking resources, and/or other resources that would have otherwise been consumed by failing to generate video captions for safety-critical events, failing to prevent traffic-related deaths and serious injuries, emergency handling of preventable traffic-related deaths and serious injuries, handling legal consequences of preventable traffic-related deaths and serious injuries, and/or the like.

In some implementations, performing the one or more actions includes the captioning system 105 causing the caption to be displayed and/or played for a passenger of an autonomous vehicle associated with the video. For example, the captioning system 105 may provide the caption in textual format and/or audio format to the vehicle associated with the video. An infotainment system of the vehicle may receive the caption in the textual format and may display the caption to a passenger of the vehicle. The infotainment system may also play the audio of the caption for the passenger. In this way, the captioning system 105 conserves computing resources, networking resources, and/or other resources that would have otherwise been consumed by failing to prevent traffic-related deaths and serious injuries, emergency handling of preventable traffic-related deaths and serious injuries, handling legal consequences of preventable traffic-related deaths and serious injuries, and/or the like.

In some implementations, performing the one or more actions includes the captioning system 105 providing the caption and the video to a fleet system responsible for a vehicle associated with the video. For example, if the vehicle associated with the video is part of a fleet of vehicles used for a service (e.g., a moving service, a delivery service, a transportation service, and/or the like), the captioning system 105 may provide the caption and the video to the fleet system monitoring the vehicle. The fleet service may take appropriate measures against the driver (e.g., an employee of the fleet service) based on a severity of the caption (e.g., caused a crash or a near-crash). In this way, the captioning system 105 conserves computing resources, networking resources, and/or other resources that would have otherwise been consumed by failing to generate video captions for safety-critical events, emergency handling of preventable traffic-related deaths and serious injuries, handling legal consequences of preventable traffic-related deaths and serious injuries, and/or the like.

In some implementations, performing the one or more actions includes the captioning system 105 causing a driver of a vehicle associated with the video to be scheduled for a defensive driving course based on the caption. For example, if the caption indicates that the driver of the vehicle caused a crash or a near-crash, the driver's insurance rate may increase because of the crash or near-crash. The captioning system 105 may cause the driver to be scheduled for the defensive driving course to counteract an increase in the driver's insurance rate. In this way, the captioning system 105 conserves computing resources, networking resources, and/or other resources that would have otherwise been consumed by failing to generate video captions for safety-critical events, failing to prevent traffic-related deaths and serious injuries, handling legal consequences of preventable traffic-related deaths and serious injuries, and/or the like.

In some implementations, performing the one or more actions includes the captioning system 105 causing insurance for a driver of a vehicle associated with the video to be adjusted based on the caption. For example, the captioning system 105 may provide the caption and/or the video to an insurance company of the driver of the vehicle. The insurance company may modify the insurance rate of the driver based on the caption. If the caption indicates that the driver performed defensively and avoided a crash, the insurance company may decrease the insurance rate of the driver. If the caption indicates that the driver caused a crash, the insurance company may increase the insurance rate of the driver. In this way, the captioning system 105 conserves computing resources, networking resources, and/or other resources that would have otherwise been consumed by failing to generate video captions for safety-critical events, failing to prevent traffic-related deaths and serious injuries, emergency handling of preventable traffic-related deaths and serious injuries, and/or the like.

In some implementations, performing the one or more actions includes the captioning system 105 retraining the CNN model and/or one or more of the decoder models based on the caption. For example, the captioning system 105 may utilize the caption as additional training data for retraining the machine learning model, thereby increasing the quantity of training data available for training the CNN model and/or one or more of the decoder models. Accordingly, the captioning system 105 may conserve computing resources associated with identifying, obtaining, and/or generating historical data for training the CNN model and/or one or more of the decoder models relative to other systems for identifying, obtaining, and/or generating historical data for training machine learning models.

In some implementations, performing the one or more actions includes the captioning system 105 adding a textual description of a video to the video itself. The textual description may enable the captioning system 105 to search for the video in the future, to classifying a type of event encountered in the video, and/or the like.

In this way, the captioning system 105 video captions safety-critical events from video data. For example, the captioning system 105 may include an encoder-decoder architecture. The encoder may be utilized to classify safety-critical driving events in videos. Four different types of decoders may be utilized to generate captions for the videos based on the classification of the safety-critical driving events output by the encoder. The captioning system 105 may apply captions to videos associated with vehicle operation and safety-critical events, and may utilize contextual information (e.g., a presence or an absence of a crash and an unsafe maneuver type) to further improve the generated captions. Thus, the captioning system 105 conserves computing resources, networking resources, and/or other resources that would have otherwise been consumed by failing to generate video captions for safety-critical events, failing to prevent traffic-related deaths and serious injuries, emergency handling of preventable traffic-related deaths and serious injuries, handling legal consequences of preventable traffic-related deaths and serious injuries, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
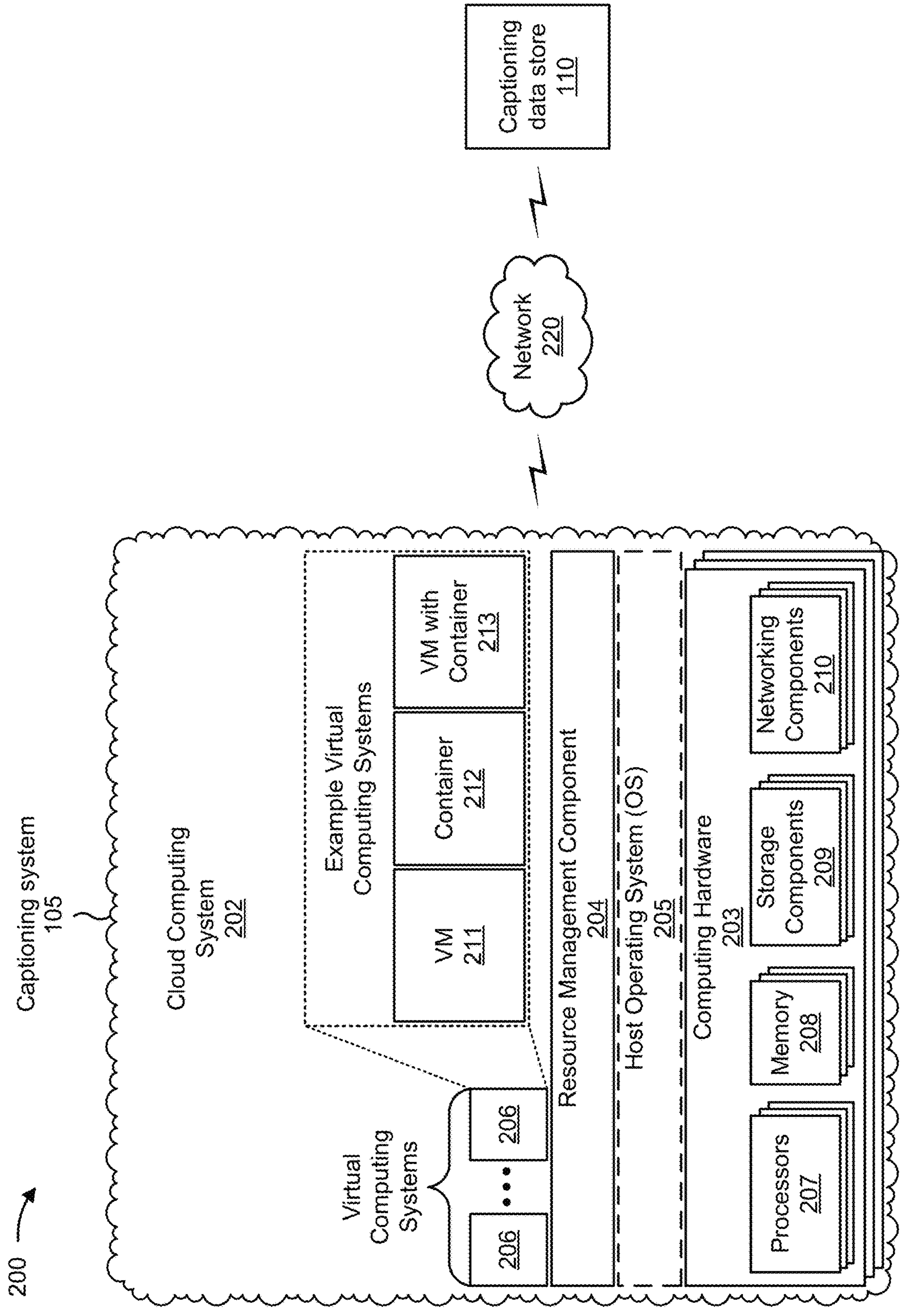
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the captioning system 105, which may include one or more elements of and/or may execute within a cloud computing system 202. The cloud computing system 202 may include one or more elements 203-213, as described in more detail below. As further shown in FIG. 2, environment 200 may include the captioning data store 110 and/or a network 220. Devices and/or elements of environment 200 may interconnect via wired connections and/or wireless connections.

The captioning data store 110 includes one or more devices capable of receiving, generating, storing, processing, and/or providing information, as described elsewhere herein. The captioning data store 110 may include a communication device and/or a computing device. For example, the captioning data store 110 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The captioning data store 110 may communicate with one or more other devices of the environment 200, as described elsewhere herein.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the captioning system 105 may include one or more elements 203-213 of the cloud computing system 202, may execute within the cloud computing system 202, and/or may be hosted within the cloud computing system 202, in some implementations, the captioning system 105 may not be cloud-based (e.g., may be implemented outside of a cloud computing system) or may be partially cloud-based. For example, the captioning system 105 may include one or more devices that are not part of the cloud computing system 202, such as the device 300 of FIG. 3, which may include a standalone server or another type of computing device. The captioning system 105 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
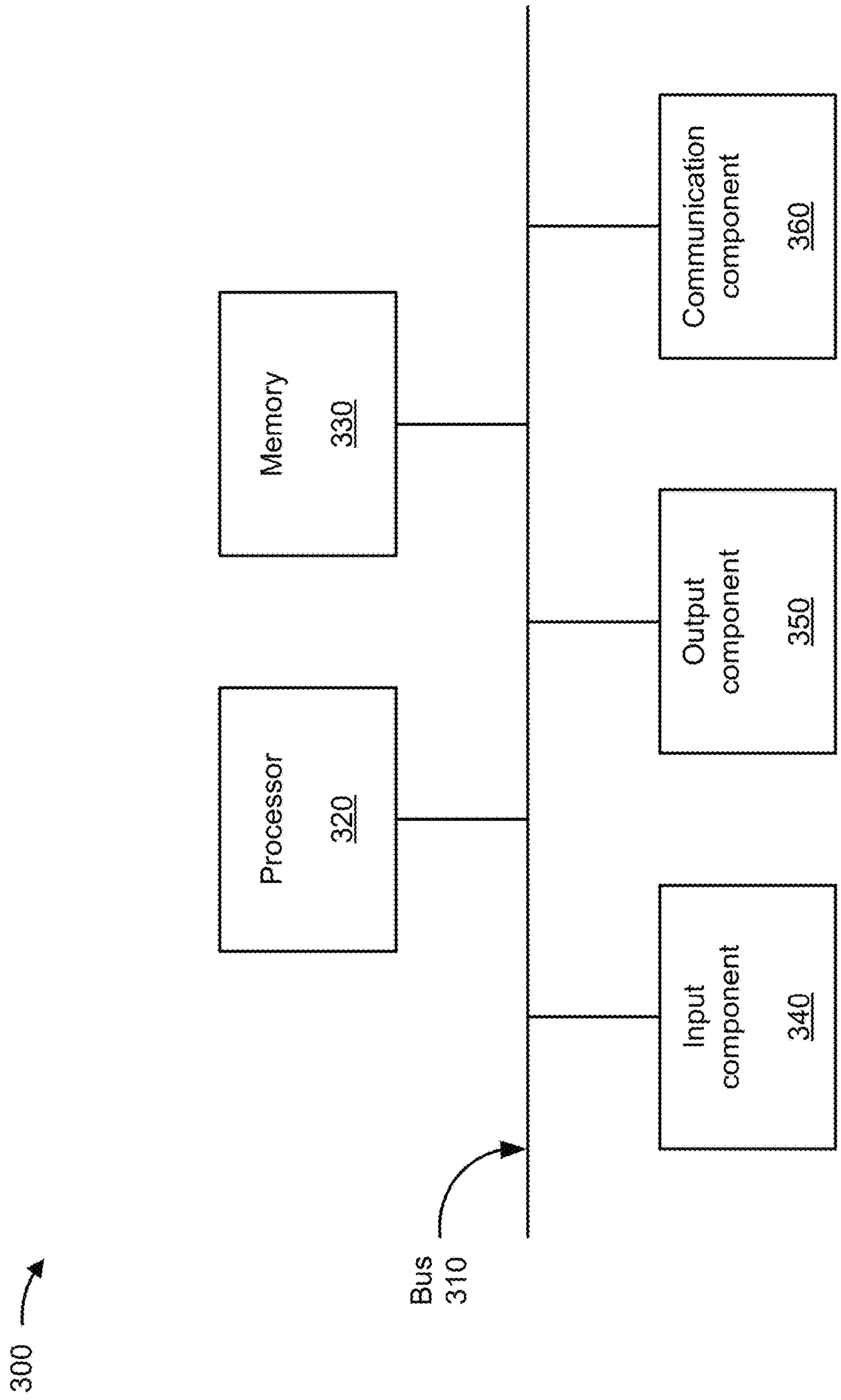
FIG. 3 is a diagram of example components of one or more devices of FIG. 3.

FIG. 3 is a diagram of example components of a device 300, which may correspond to the captioning system 105 and/or the captioning data store 110. In some implementations, the captioning system 105 and/or the captioning data store 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
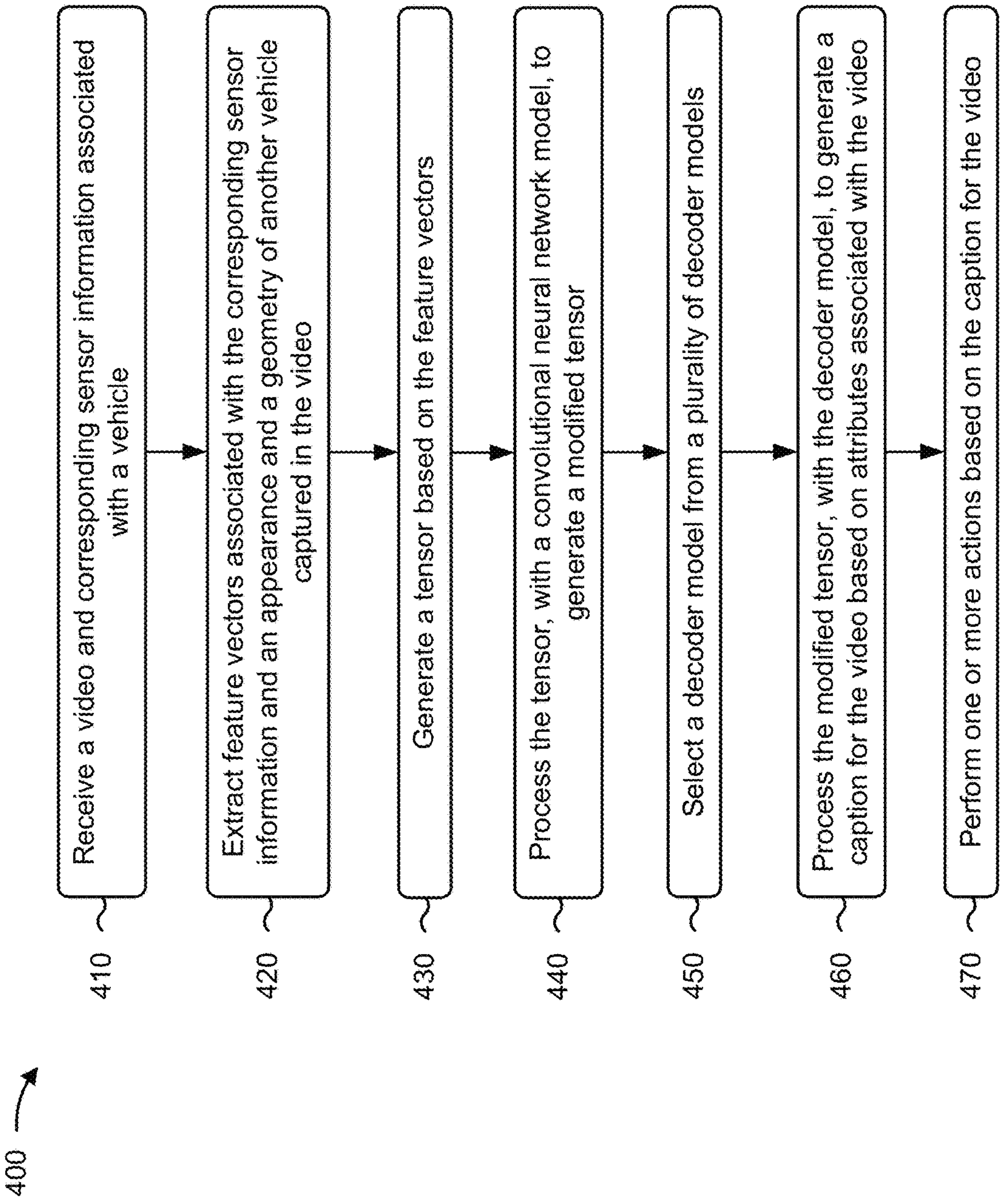
FIG. 4 is a flowchart of an example process for video captioning safety-critical events from video data.

FIG. 4 is a flowchart of an example process 400 for video captioning safety-critical events from video data. In some implementations, one or more process blocks of FIG. 4 may be performed by a device (e.g., the captioning system 105). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a video and corresponding sensor information associated with a vehicle (block 410). For example, the device may receive a video and corresponding sensor information associated with a vehicle, as described above. In some implementations, the corresponding sensor information includes information identifying one or more of speeds of the vehicle during the video, accelerations of the vehicle during the video, or orientations of the vehicle during the video.

As further shown in FIG. 4, process 400 may include extracting feature vectors associated with the corresponding sensor information and an appearance and a geometry of another vehicle captured in the video (block 420). For example, the device may extract feature vectors associated with the corresponding sensor information and an appearance and a geometry of another vehicle captured in the video, as described above. In some implementations, extracting the feature vectors associated with the corresponding sensor information and the appearance and the geometry of the other vehicle captured in the video includes extracting an appearance feature vector based on the appearance of the other vehicle, extracting a geometry feature vector based on the geometry of the other vehicle, and extracting a sensor feature vector based on the corresponding sensor information.

As further shown in FIG. 4, process 400 may include generating a tensor based on the feature vectors (block 430). For example, the device may generate a tensor based on the feature vectors, as described above. In some implementations, generating the tensor based on the feature vectors includes concatenating the feature vectors, based on a feature dimension, to generate the tensor.

As further shown in FIG. 4, process 400 may include processing the tensor, with a convolutional neural network model, to generate a modified tensor (block 440). For example, the device may process the tensor, with a convolutional neural network model, to generate a modified tensor, as described above. In some implementations, the modified tensor includes a reduced temporal dimension compared to a temporal dimension of the tensor, and includes a different feature dimension compared to a feature dimension of the tensor. In some implementations, processing the tensor, with the convolutional neural network model, to generate the modified tensor includes performing convolution operations on the tensor to generate convolution results, performing rectified linear unit activations on the convolution results to generate activation results, and performing max-pooling operations on the activation results to generate the modified tensor.

As further shown in FIG. 4, process 400 may include selecting a decoder model from a plurality of decoder models (block 450). For example, the device may select a decoder model from a plurality of decoder models based on a quality of a caption to be generated and/or based on the encoder utilized, as described above. In some implementations, the decoder model includes a recurrent neural network model. In some implementations, the plurality of decoder models includes one or more of a single-loop decoder model with pooling, a single-loop decoder model with attention, a hierarchical decoder model with pooling, and a hierarchical decoder model with attention. In some implementations, the decoder model includes one of a single-loop recurrent neural network (RNN) model with pooling, a single-loop RNN model with attention, a hierarchical RNN model with pooling, or a hierarchical RNN model with attention.

As further shown in FIG. 4, process 400 may include processing the modified tensor, with the decoder model, to generate a caption for the video based on attributes associated with the video (block 460). For example, the device may process the modified tensor, with the decoder model, to generate a caption for the video based on attributes associated with the video, as described above. In some implementations, the attributes associated with the video include one or more of an attribute indicating that the vehicle is associated with a crash event, or an attribute indicating that the vehicle is associated with a near-crash event.

As further shown in FIG. 4, process 400 may include performing one or more actions based on the caption for the video (block 470). For example, the device may perform one or more actions based on the caption for the video, as described above. In some implementations, performing the one or more actions includes one or more of causing the caption to be displayed or played for a driver of the vehicle, causing the caption to be displayed or played for a passenger of the vehicle when the vehicle is an autonomous vehicle, or providing the caption and the video to a fleet system responsible for the vehicle. In some implementations, performing the one or more actions includes one or more of causing a driver of the vehicle to be scheduled for a defensive driving course based on the caption, causing insurance for a driver of the vehicle to be adjusted based on the caption, or retraining the convolutional neural network model or one or more of the plurality of decoder models based on the caption.

In some implementations, process 400 includes receiving sensor information associated with sensors of vehicles that capture a plurality of videos; receiving the plurality of videos; and mapping, in a data store, the sensor information and the plurality of videos, where the video and the corresponding sensor information is received from the data store.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, a video and corresponding sensor information associated with a vehicle, wherein the corresponding sensor information is related to information from one or more sensor devices of the vehicle, wherein the corresponding sensor information includes information identifying an orientation of the vehicle when the video was captured, and wherein the one or more sensor devices collect sensor information of the vehicle;

extracting, by the device, feature vectors associated with the corresponding sensor information and an appearance and a geometry of another vehicle captured in the video, wherein the feature vectors include a sensor information feature vector, a geometry feature vector and an appearance feature vector;

generating, by the device, a tensor by concatenating the sensor information feature vector, the geometry feature vector and the appearance feature vector based on a feature dimension;

processing, by the device, the tensor, with a convolutional neural network model, to generate a modified tensor;

selecting, by the device, a decoder model from a plurality of decoder models, wherein the decoder model is selected from the plurality of decoder models based on a quality of a caption to be generated;

processing, by the device and based on attributes associated with the video, the modified tensor, with the decoder model, to generate the caption for the video, wherein the attributes include the corresponding sensor information; and performing, by the device, one or more actions based on the caption for the video.

2. The method of claim 1, further comprising:

receiving sensor information associated with sensors of vehicles that capture a plurality of videos;

receiving the plurality of videos; and mapping, in a data store, the sensor information and the plurality of videos, wherein the video and the corresponding sensor information is received from the data store.

3. The method of claim 1, wherein extracting the feature vectors associated with the corresponding sensor information and the appearance and the geometry of the other vehicle captured in the video comprises:

extracting the appearance feature vector based on the appearance of the other vehicle;

extracting the geometry feature vector based on the geometry of the other vehicle; and extracting the sensor information feature vector based on the corresponding sensor information.

4. The method of claim 1, wherein the modified tensor includes a reduced temporal dimension compared to a temporal dimension of the tensor, and includes a different feature dimension compared to a feature dimension of the tensor.

5. The method of claim 1, wherein the attributes is associated with safety.

6. The method of claim 1, wherein the attributes associated with the video include one or more of:

an attribute indicating that the vehicle is associated with a crash event, or an attribute indicating that the vehicle is associated with a near-crash event.

7. A device, comprising:

one or more processors configured to:

receive a video and corresponding sensor information associated with a vehicle, wherein the corresponding sensor information is related to information from one or more sensor devices of the vehicle and includes information identifying speeds, accelerations, and orientations of the vehicle when the video was captured, and wherein the one or more sensor devices collect sensor information of the vehicle;

extract feature vectors associated with the corresponding sensor information and an appearance and a geometry of another vehicle captured in the video, wherein the feature vectors include a sensor information feature vector, a geometry feature vector and an appearance feature vector;

generate a tensor by concatenating the sensor information feature vector, the geometry feature vector and the appearance feature vector based on a feature dimension;

process the tensor, with a convolutional neural network model, to generate a modified tensor;

select a decoder model from a plurality of decoder models, wherein the decoder model is selected from the plurality of decoder models based on a quality of a caption to be generated;

process, with the decoder model and based on attributes associated with the video, the modified tensor to generate the caption for the video, wherein the attributes include the corresponding sensor information; and perform one or more actions based on the caption for the video.

8. The device of claim 7, wherein the plurality of decoder models includes one or more of:

a single-loop decoder model with pooling, a single-loop decoder model with attention, a hierarchical decoder model with pooling, or a hierarchical decoder model with attention.

9. The device of claim 7, wherein the attributes associated with the video include one or more of:

an attribute indicating that the vehicle is associated with a crash event, or an attribute indicating that the vehicle is associated with a near-crash event.

10. The device of claim 7, wherein the one or more processors, to perform the one or more actions, are configured to one or more of:

cause the caption to be displayed or played for a driver of the vehicle;

cause the caption to be displayed or played for a passenger of the vehicle when the vehicle is an autonomous vehicle; or provide the caption and the video to a fleet system responsible for the vehicle.

11. The device of claim 7, wherein the one or more processors, to perform the one or more actions, are configured to one or more of:

cause a driver of the vehicle to be scheduled for a defensive driving course based on the caption;

cause insurance for a driver of the vehicle to be adjusted based on the caption; or retrain the convolutional neural network model or one or more of the plurality of decoder models based on the caption.

12. The device of claim 8, wherein the decoder model includes one of:

a single-loop recurrent neural network (RNN) model with pooling, a single-loop RNN model with attention, a hierarchical RNN model with pooling, or a hierarchical RNN model with attention.

13. The device of claim 7, wherein the one or more processors, to process the tensor, with the convolutional neural network model, to generate the modified tensor, are configured to:

perform convolution operations on the tensor to generate convolution results;

perform rectified linear unit activations on the convolution results to generate activation results; and perform max-pooling operations on the activation results to generate the modified tensor.

14. The device of claim 7, wherein the decoder model utilizes the attributes to adjust a probability of words to be utilized in generating the caption.

15. A non-transitory computer-readable medium storing a set of instructions, the set of instructions comprising:

one or more instructions that, when executed by one or more processors of a device, cause the device to:

receive sensor information associated with sensors of vehicles that capture a plurality of videos;

receive the plurality of videos;

map, in a data store, the sensor information and the plurality of videos;

receive, from the data store, a video, of the plurality of videos, and corresponding sensor information associated with a vehicle, wherein the corresponding sensor information is related to information from one or more other sensors of the vehicle, wherein the corresponding sensor information includes information identifying an orientation of the vehicle when the video was captured, and wherein the one or more other sensors collect sensor information of the vehicle;

extract feature vectors associated with the corresponding sensor information and an appearance and a geometry of another vehicle captured in the video, wherein the feature vectors include a sensor information feature vector, a geometry feature vector and an appearance feature vector;

generate a tensor by concatenating the sensor information feature vector, the geometry feature vector and the appearance feature vector based on a feature dimension;

process the tensor, with a convolutional neural network model, to generate a modified tensor;

select a decoder model from a plurality of decoder models, wherein the decoder model is selected from the plurality of decoder models based on a quality of a caption to be generated;

process the modified tensor, with the decoder model and based on attributes associated with the video, to generate the caption for the video, wherein the attributes include the corresponding sensor information; and perform one or more actions based on the caption for the video.

16. The non-transitory computer-readable medium of claim 15, wherein the one or more instructions, that cause the device to extract the feature vectors associated with the corresponding sensor information and the appearance and the geometry of the other vehicle captured in the video, cause the device to:

extract the appearance feature vector based on the appearance of the other vehicle;

extract the geometry feature vector based on the geometry of the other vehicle; and extract the sensor information feature vector based on the corresponding sensor information.

17. The non-transitory computer-readable medium of claim 15, wherein the plurality of decoder models includes one or more of:

a single-loop recurrent neural network (RNN) model with pooling, a single-loop RNN model with attention, a hierarchical RNN model with pooling, and a hierarchical RNN model with attention.

18. The non-transitory computer-readable medium of claim 15, wherein the one or more instructions, that cause the device to perform the one or more actions, cause the device to one or more of:

cause the caption to be displayed or played for a driver of the vehicle;

cause the caption to be displayed or played for a passenger of the vehicle when the vehicle is an autonomous vehicle;

provide the caption and the video to a fleet system responsible for the vehicle;

cause a driver of the vehicle to be scheduled for a defensive driving course based on the caption;

cause insurance for a driver of the vehicle to be adjusted based on the caption; or retrain the convolutional neural network model or one or more of the plurality of decoder models based on the caption.

19. The non-transitory computer-readable medium of claim 15, wherein the one or more instructions, that cause the device to process the tensor, with the convolutional neural network model, to generate the modified tensor, cause the device to:

perform convolution operations on the tensor to generate convolution results;

perform rectified linear unit activations on the convolution results to generate activation results; and perform max-pooling operations on the activation results to generate the modified tensor.

20. The non-transitory computer-readable medium of claim 15, wherein the decoder model utilizes the attributes to adjust a probability of words to be utilized in generating the caption.

* * * * *